3,137,693
SUBSTITUTED PYRIDO[2,3-e]-AS-TRIAZINE
1-OXIDES
John Anthony Carbon, Lake Bluff, Ill., assignor to Abbott Laboratories, North Chicago, Ill., a corporation of Illinois
No Drawing. Filed Feb. 8, 1962, Ser. No. 171,807
18 Claims. (Cl. 260—247.5)

This invention relates to novel compounds of the formula

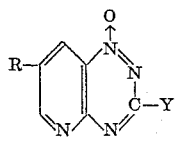

and a method for their preparation. In this and succeeding formulas, R is hydrogen, loweralkyl or halogen and Y is monoloweralkylamino, diloweralkylamino, loweralkoxy, hydrazino, piperidino, morpholino, cyclohexylamino, phenethylamino, mercapto or diloweralkylaminoloweralkylamino. The terms "loweralkyl" and "loweralkoxy" as employed herein refer to the alkyl and alkoxy radicals containing from 1 to 4 carbon atoms, inclusive.

These compounds are crystalline solids useful as tranquilizers and antibacterial agents. When dispersed in water at a concentration of 50 parts per million, they inhibit the growth of bacteria such as *Escherichia coli*, *Salmonella typhimurium* and *Staphylococcus aureus*.

All of the compounds, other than where Y is mercapto, can be prepared by the reaction of two molecular proportions of a compound of the formula H-Y with one molecular proportion of a compound of the formula

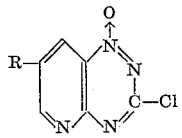

in an inert solvent such as chloroform at a temperature of 0°–10° C. When the reaction is complete, the reaction mixture is poured into ice-water, the product extracted with chloroform, the solvent evaporated and the residue purified by recrystalilzation from an organic solvent such as ethanol or a mixture of ethanol and water.

The compounds wherein Y is mercapto are prepared by refluxing an alcoholic solution of two parts of thiourea and one part of a compound of the formula

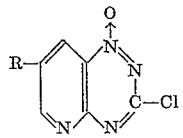

and thereafter separating the solid product formed followed by purification of said product by dissolution in aqueous alkali and reprecipitation with acetic acid.

The examples which follow illustrate rather than limit the claimed invention.

*Example 1*

3 - diethylaminopyrido[2,3 - e] - as - triazine 1 - oxide.—One-tenth mole of 3-chloropyrido[2,3-e]-as-triazine 1-oxide was dissolved in 300 ml. of chloroform and cooled to 0° C. A solution of 0.21 mole of diethylamine in 120 ml. of chloroform was then added portionwise while maintaining the temperature below 10° C. After standing at 5° C. for one hour, the reaction mixture was poured into ice-water, the solid product which formed was extracted with chloroform and the chloroform evaporated. The residue was purified by recrystallization from ethanol to obtain the desired product which melted at 124°–125° C.

*Example 2*

The reaction of 3-chloropyrido[2,3-e]-as-triazine 1-oxide with piperidine in the same manner as that described in Example 1 produced 3-piperidinopyrido[2,3-e]-as-triazine 1-oxide which melted at 116°–117° C.

*Example 3*

By substituting morpholine for the diethylamine of Example 1, there is obtained 3-morpholinopyrido[2,3-e]-as-triazine 1-oxide melting at 169°–170° C.

*Example 4*

The substitution of cyclohexylamine for diethylamine in Example 1 will produce 3-cyclohexylaminopyrido-[2,3-e]-as-triazine 1-oxide which melts at 190°–191° C.

*Example 5*

Replacing diethylamine of Example I with phenethylamine results in the production of 3-phenethylaminopyrido[2,3-e]-as-triazine 1-oxide which has a melting point of 174°–175° C.

*Example 6*

The reaction of n-butylamine with 3-chloropyrido-[2,3-e]-as-triazine 1-oxide as described in Example 1 produces 3-n-butylaminopyrido[2,3-e]-as-triazine 1-oxide melting at 174°–175° C.

*Example 7*

The replacement of diethylamine of Example 1 with dimethylaminopropylamine readily forms 3-dimethylaminopropylaminopyrido[2,3-e]-as-triazine 1-oxide which melts at 250°–251° C. with decomposition.

*Example 8*

In the same manner as that described in Example 1, the reaction of hydrazine with 3-chloropyrido[2,3-e]-as-triazine 1-oxide will produce 3-hydrazinopyrido[2,3-e]-as-triazine 1-oxide melting at 252°–253° C. with decomposition.

*Example 9*

Reacting sodium methoxide or sodium n-butoxide with 3-chloropyrido[2,3-e]-as-triazine 1-oxide as described in Example 1 will produce 3-methoxypyrido[2,3-e]-as-triazine 1-oxide and 3-n-butoxypyrido[2,3-e]-as-triazine 1-oxide, respectively, the former of which melts at 149° C. with decomposition and the latter of which melts at 99°–100° C.

*Example 10*

When 3-chloropyrido[2,3-e]-as-triazine 1-oxide is reacted in the manner described in Example 1 with ethanol, isopropanol, dimethylamine, di-n-propylamine, methylamine, ethylamine, isopropylamine, diethylaminoethylamine, dipropylaminomethylamine or dimethylaminobutylamine there is obtained respectively, 3-ethoxypyrido[2,3-e]-as-triazine 1-oxide
3-isopropoxypyrido[2,3-e]-as-triazine 1-oxide
3-dimethylaminopyrido[2,3-e]-as-triazine 1-oxide
3-di-n-propylaminopyrido[2,3-e]-as-triazine 1-oxide
3-methylaminopyrido[2,3-e]-as-triazine 1-oxide
3-ethylaminopyrido[2,3-e]-as-triazine 1-oxide
3-isopropylaminopyrido[2,3-e]-as-triazine 1-oxide
3-diethylaminoethylaminopyrido[2,3-e]-as-triazine 1-oxide
3-dipropylaminomethylaminopyrido[2,3-e]-as-triazine 1-oxide and
3-dimethylaminobutylaminopyrido[2,3-e]-as-triazine 1-oxide

Example 11

Refluxing a solution of 6 grams (0.08 mole) of thiourea and 6 grams (0.03 mole) of 3-chloropyrido[2,3-e]-as-triazine 1-oxide in 100 ml. of ethanol for one hour and thereafter cooling the reaction mixture will precipitate 3-mercaptopyrido[2,3-e]-as-triazine 1-oxide which after purification by dissolution in aqueous alkali and reprecipitation with acetic acid melts at 197°–198° C. with decomposition.

In like manner the reaction of a 3-chloro-7-lower alkylpyrido[2,3-e]-as-triazine 1-oxide or a 3-chloro-7-halopyrido[2,3-e]-as-triazine 1-oxide with thiourea will produce the corresponding 3-mercapto-7-lower alkylpyrido[2,3-e]-as-triazine 1-oxides and 3-mercapto-7-halopyrido[2,3-e]-as-triazine 1-oxides.

Example 12

In the same manner as that described in Example 1, the reaction of 3-chloro-7-methylpyrido[2,3-e]-as-triazine 1-oxide with diethylamine, piperidine, morpholine, cyclohexylamine or hydrazine will form respectively:

3-diethylamino-7-methylpyrido[2,3-e]-as-triazine 1-oxide melting at 102°–103° C.
3-piperidino-7-methylpyrido[2,3-e]-as-triazine 1-oxide melting at 137°–138° C.
3-morpholino-7-methylpyrido[2,3-e]-as-triazine 1-oxide melting at 242°–243° C.
3-cyclohexylamino-7-methylpyrido[2,3-e]-as-triazine 1-oxide melting at 219°–220° C. and
3-hydrazino-7-methylpyrido[2,3-e]-as-triazine 1-oxide melting at 245°–246° C. with decomposition.

In a similar manner, the reaction of 3-chloro-7-methylpyrido[2,3-e]-as-triazine 1-oxide with phenethylamine, methylamine, ethylamine, n-propylamine, isobutylamine, methanol, ethanol, propanol or butanol will produce respectively:

3-phenethylamino-7-methylpyrido[2,3-e]-as-triazine 1-oxide
3-methylamino-7-methylpyrido[2,3-e]-as-triazine 1-oxide
3-ethylamino-7-methylpyrido[2,3-e]-as-triazine 1-oxide
3-n-propylamino-7-methylpyrido[2,3-e]-as-triazine 1-oxide
3-isobutylamino-7-methylpyrido[2,3-e]-as-triazine 1-oxide
3-methoxy-7-methylpyrido[2,3-e]-as-triazine 1-oxide
3-ethoxy-7-methylpyrido[2,3-e]-as-triazine 1-oxide
3-propoxy-7-methylpyrido[2,3-e]-as-triazine 1-oxide and
3-butoxy-7-methylpyrido[2,3-e]-as-triazine 1-oxide.

Example 13

By following the procedure of Example 1, the reaction of a compound of the formula

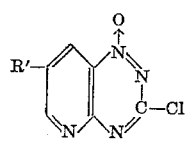

wherein R' is ethyl, propyl, butyl, chloro, bromo, fluoro or iodo with a monoloweralkylamine, diloweralkylamine, lower alkanol, hydrazine, piperidine, morpholine, cyclohexylamine, phenethylamine, or diloweralkylaminoloweralkylamine will produce compounds of the formula

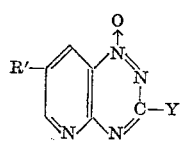

wherein R' is as defined above and Y is methylamino, ethylamino, propylamino, butylamino, dimethylamino, diethylamino, dipropylamino, dibutylamino, methoxy, ethoxy, propoxy, butoxy, hydrazino, piperidino, morpholino, cyclohexylamino, phenethylamino, dimethylaminoethylamino or diethylaminomethylamino.

The 3-chloro-7-R-pyrido[2,3-e]-as-triazine 1-oxides employed as starting materials in the present invention can be prepared by refluxing two parts of guanidine and one part of a compound of the formula

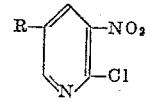

in a solvent such as t-butyl alcohol to form a compound of the formula

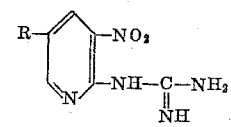

which is heated on a steam bath with water in the presence of a catalyst such as potassium carbonate to obtain a compound of the formula

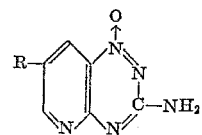

which is thereafter reacted at about 20° C. with sodium nitrite in an acidified aqueous medium to obtain a compound of the formula

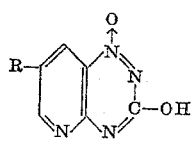

which is then refluxed with excess phosphorus oxychloride. When the reaction is complete, the excess POCl₃ is removed, the residue poured into ice-water, the product extracted with chloroform, the chloroform evaporated and the residue recrystallized from methanol. In this manner, there is obtained 3-chloropyrido[2,3-e]-as-triazine 1-oxide which melts at 139°–140° C. and 3-chloro-7-methylpyrido[2,3-e]-as-triazine 1-oxide melting at 182°–183° C.

What I claim is:

1. A compound of the formula

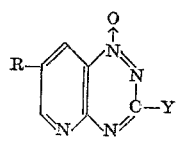

wherein R is a member of the group consisting of hydrogen, lower alkyl and halogen and Y is a member of the group consisting of monoloweralkylamino, diloweralkylamino, loweralkoxy, hydrazino, piperidino, morpholino, cyclohexylamino, phenethylamino, mercapto and diloweralkylaminoloweralkylamino.
2. 3-diethylaminopyrido[2,3-e]-as-triazine 1-oxide.
3. 3-piperidinopyrido[2,3-e]-as-triazine 1-oxide.
4. 3-morpholinopyrido[2,3-e]-as-triazine 1-oxide.
5. 3-cyclohexylaminopyrido[2,3-e]-as-triazine 1-oxide.
6. 3-phenethylaminopyrido[2,3-e]-as-triazine 1-oxide.

7. 3-n-butylaminopyrido[2,3-e]-as-triazine 1-oxide.
8. 3 - dimethylaminopropylaminopyrido[2,3 - e] - as-triazine 1-oxide.
9. 3-hydrazinopyrido[2,3-e]-as-triazine 1-oxide.
10. 3-methoxypyrido[2,3-e]-as-triazine 1-oxide.
11. 3-n-butoxypyrido[2,3-e]-as-triazine 1-oxide.
12. 3-mercaptopyrido[2,3-e]-as-triazine 1-oxide.
13. 3 - diethylamino-7-methylpyrido[2,3-e]-as-triazine 1-oxide.
14. 3 - piperidino-7-methylpyrido[2,3-e]-as-triazine 1-oxide.
15. 3-morpholino-7-methylpyrido[2,3-e]-as-triazine 1-oxide.
16. 3 - cyclohexylamino - 7 - methylpyrido[2,3 - e]-as-triazine 1-oxide.
17. 3 - hydrazino-7-methylpyrido[2,3-e]-as-triazine 1-oxide.

18. A method for the preparation of a compound of the formula

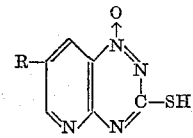

wherein R is a member of the group consisting of hydrogen, loweralkyl and halogen which comprises refluxing in an inert solvent two parts of thiourea and one part of a 3-chloro-7-R-pyrido[2,3-e]-as-triazine 1-oxide and separating the product formed from the reaction mixture.

References Cited in the file of this patent
UNITED STATES PATENTS
2,489,355   Wolf et al. _____ Nov. 29, 1949